(12) United States Patent
Pigliapoco

(10) Patent No.: US 11,578,817 B2
(45) Date of Patent: Feb. 14, 2023

(54) METHOD AND SYSTEM FOR LAYING A PIPELINE ON THE BED OF A BODY OF WATER

(71) Applicant: SAIPEM S.p.A., San Donato Milanese (IT)

(72) Inventor: Mauro Pigliapoco, San Donato Milanese (IT)

(73) Assignee: SAIPEM S.P.A., San Donato Milanese (IT)

(*) Notice: Subject to any disclaimer, the term of this patent is extended or adjusted under 35 U.S.C. 154(b) by 0 days.

(21) Appl. No.: 17/275,564

(22) PCT Filed: Sep. 17, 2019

(86) PCT No.: PCT/IB2019/057822
§ 371 (c)(1),
(2) Date: Mar. 11, 2021

(87) PCT Pub. No.: WO2020/058848
PCT Pub. Date: Mar. 26, 2020

(65) Prior Publication Data
US 2021/0364103 A1   Nov. 25, 2021

(30) Foreign Application Priority Data
Sep. 17, 2018  (IT) .......................... 102018000008658

(51) Int. Cl.
*F16L 1/16*  (2006.01)
*F16L 1/12*  (2006.01)
*F16L 1/235* (2006.01)

(52) U.S. Cl.
CPC .................. *F16L 1/123* (2013.01); *F16L 1/16* (2013.01); *F16L 1/235* (2013.01)

(58) Field of Classification Search
CPC ........................................................ F16L 1/12
See application file for complete search history.

(56) References Cited

U.S. PATENT DOCUMENTS

| 7,963,721 B2 | 6/2011 | Joshi et al. | |
| 9,080,708 B2 * | 7/2015 | Early | F16L 1/235 |

(Continued)

FOREIGN PATENT DOCUMENTS

| EP | 0 963 798 A1 | 12/1999 |
| WO | WO 2011/008704 A1 | 1/2011 |

(Continued)

OTHER PUBLICATIONS

Notification Concerning Submission, Obtention or Transmittal of Priority Document for International Application No. PCT/IB2019/057822 dated Nov. 13, 2019.

(Continued)

*Primary Examiner* — Sean D Andrish
(74) *Attorney, Agent, or Firm* — Neal, Gerber & Eisenberg LLP

(57) ABSTRACT

A method for laying a pipeline on the bed of a body of water comprises assembling a pipeline on a laying vessel; launching the pipeline from the laying vessel; identifying a zone of the bed of the body of water that causes stresses greater than a threshold value determined for the pipeline; progressively laying the pipeline on the bed of the body of water by advancing the laying vessel; and making, through controlled plastic deformation, at least one curved section along the pipeline with a curvature concordant with the curvature assumed by the pipeline in proximity to said zone, when the pipeline is at least partly laid on the bed of the body of water and partly suspended with respect to the bed of the body of water in proximity to said zone.

16 Claims, 9 Drawing Sheets

(56) References Cited

U.S. PATENT DOCUMENTS

| | | |
|---|---|---|
| 2006/0067792 A1 | 3/2006 | Joshi et al. |
| 2007/0081862 A1 | 4/2007 | Wolbers et al. |
| 2012/0257930 A1 | 10/2012 | Persson |
| 2017/0292246 A1* | 10/2017 | Lazzarin .................. E02F 5/04 |

FOREIGN PATENT DOCUMENTS

| | | |
|---|---|---|
| WO | WO 2016/046805 A1 | 3/2016 |
| WO | WO 2017/013541 A1 | 1/2017 |
| WO | WO 2018/154311 * | 8/2018 |

OTHER PUBLICATIONS

International Search Report and Written Opinion for International Application No. PCT/IB2019/057822 dated Dec. 16, 2019.
PCT Demand for International Preliminary Examination and Reply to International Search Report and the associated Written Opinion for International Application No. PCT/IB2019/057822 dated Apr. 24, 2020,.
Notification of Receipt of Demand by Competent International Preliminary Examining Authority (Form PCT/IPEA/402) for International Application No. PCT/IB2019/057822 dated Apr. 30, 2020.
Notification of Transmittal of the International Preliminary Report on Patentability (Form PCT/IPEA/416) for International Application No. PCT/IB2019/057822 dated Jun. 12, 2020.

\* cited by examiner

FIG. 1A
FIG. 1B
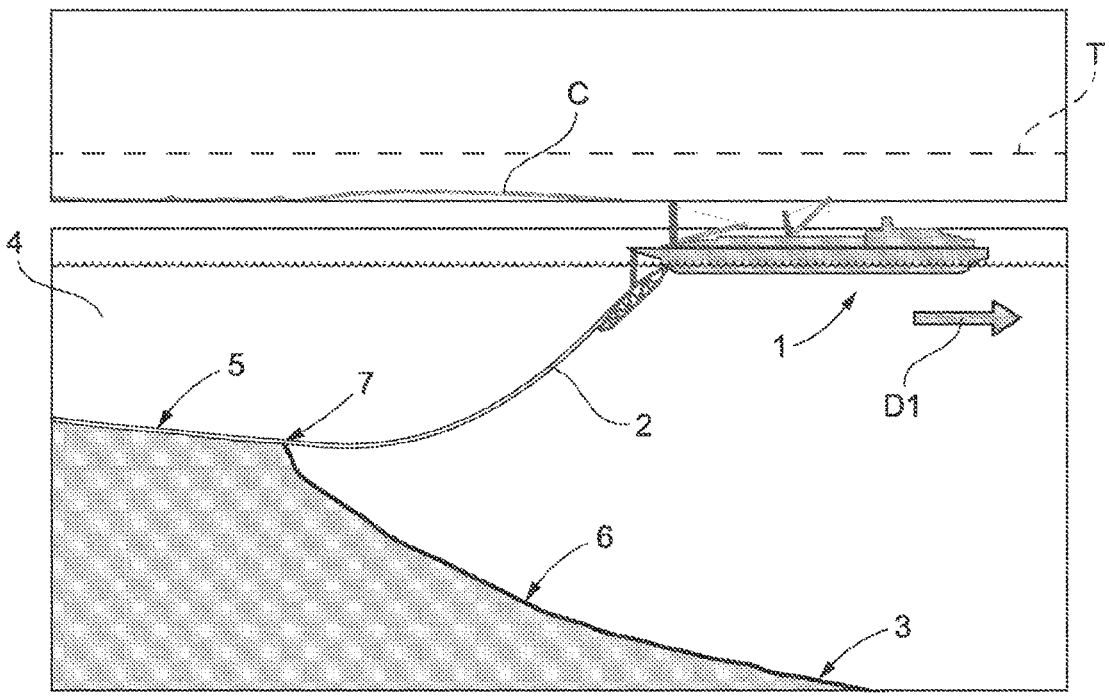
FIG. 2A
FIG. 2B
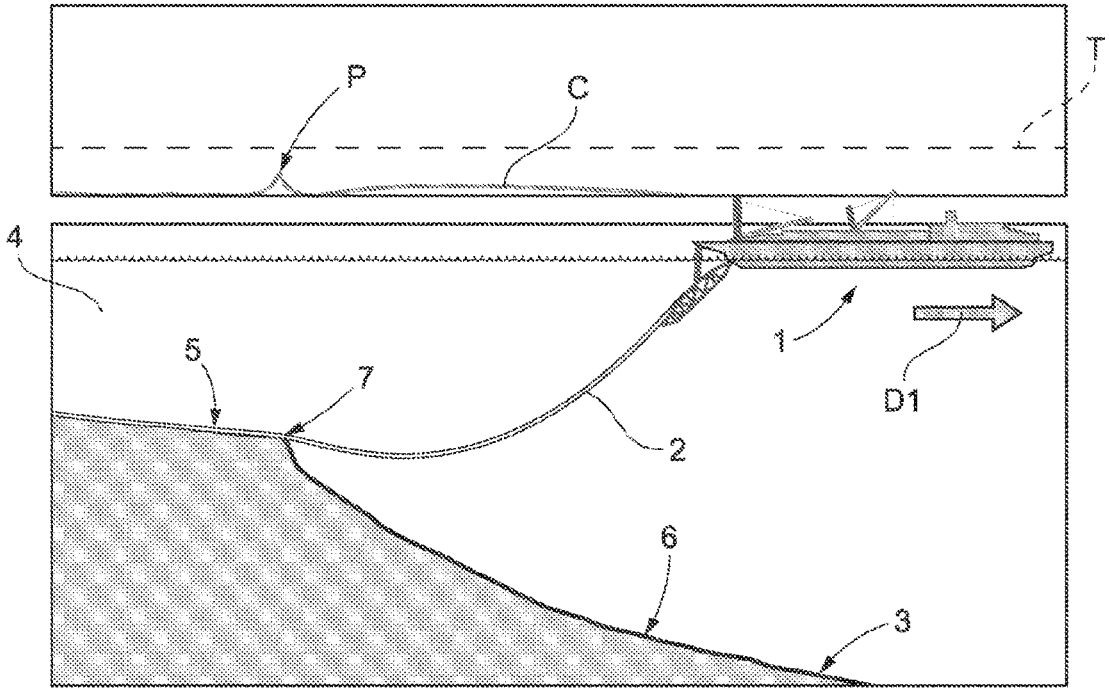

FIG. 3A
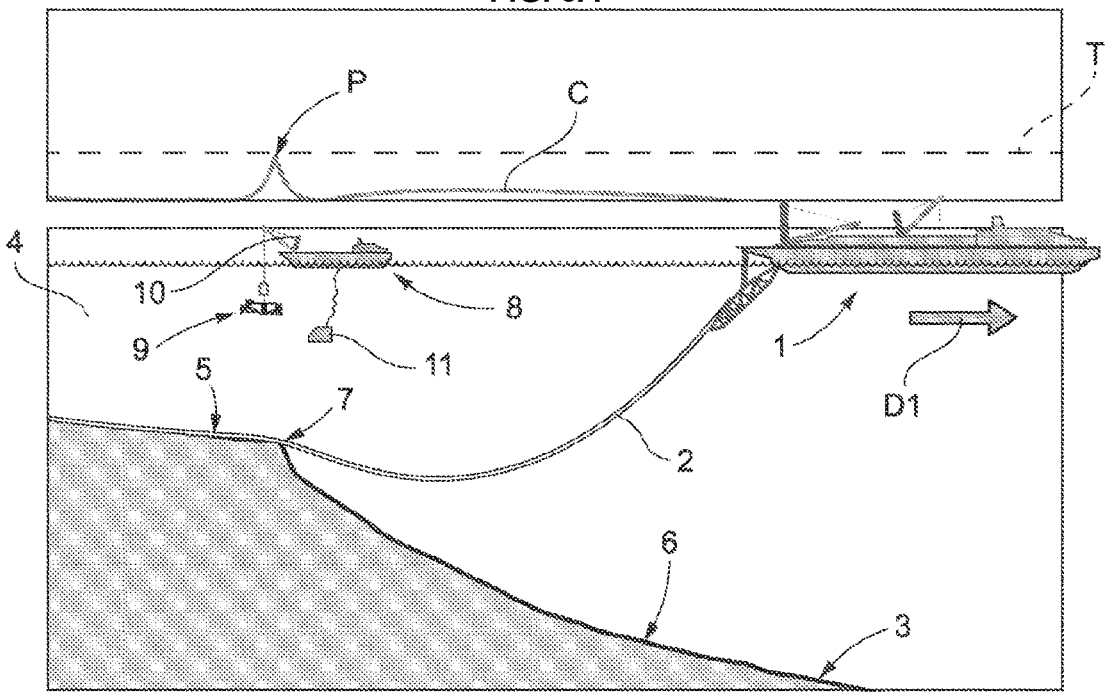
FIG. 3B
FIG. 4A
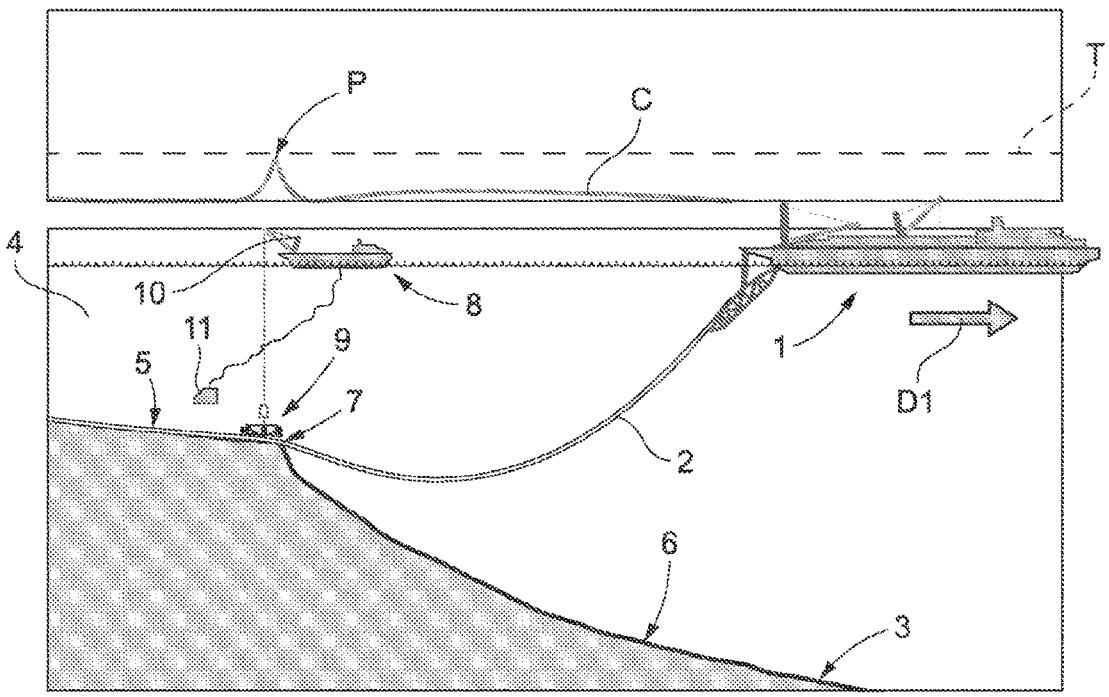
FIG. 4B

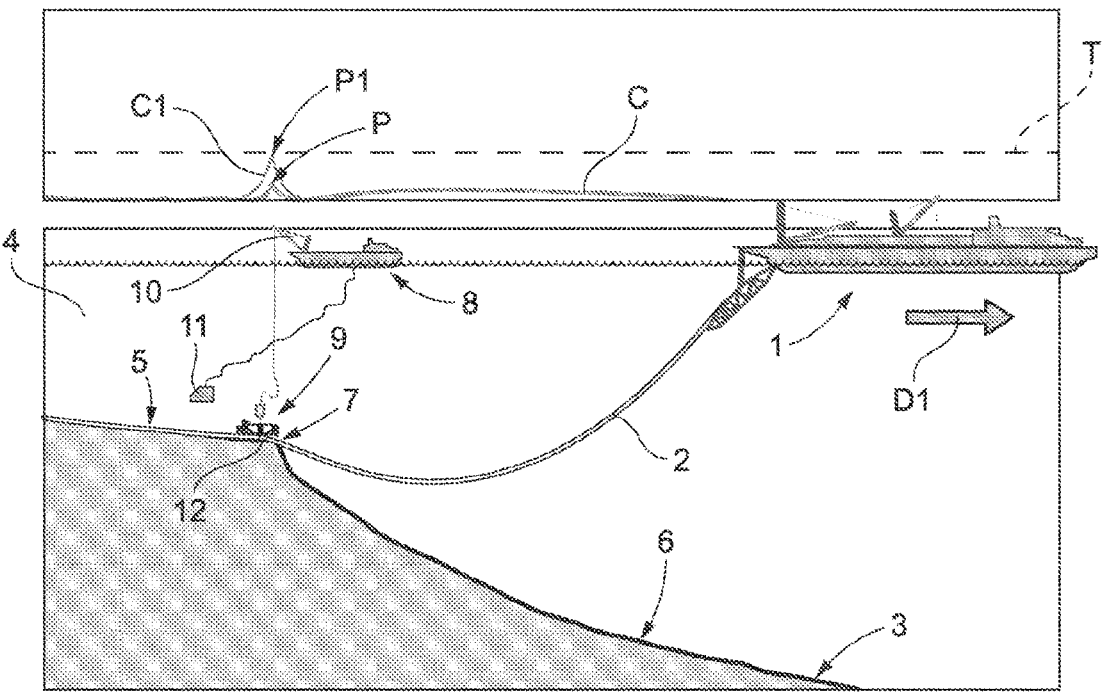
FIG. 5A
FIG. 5B
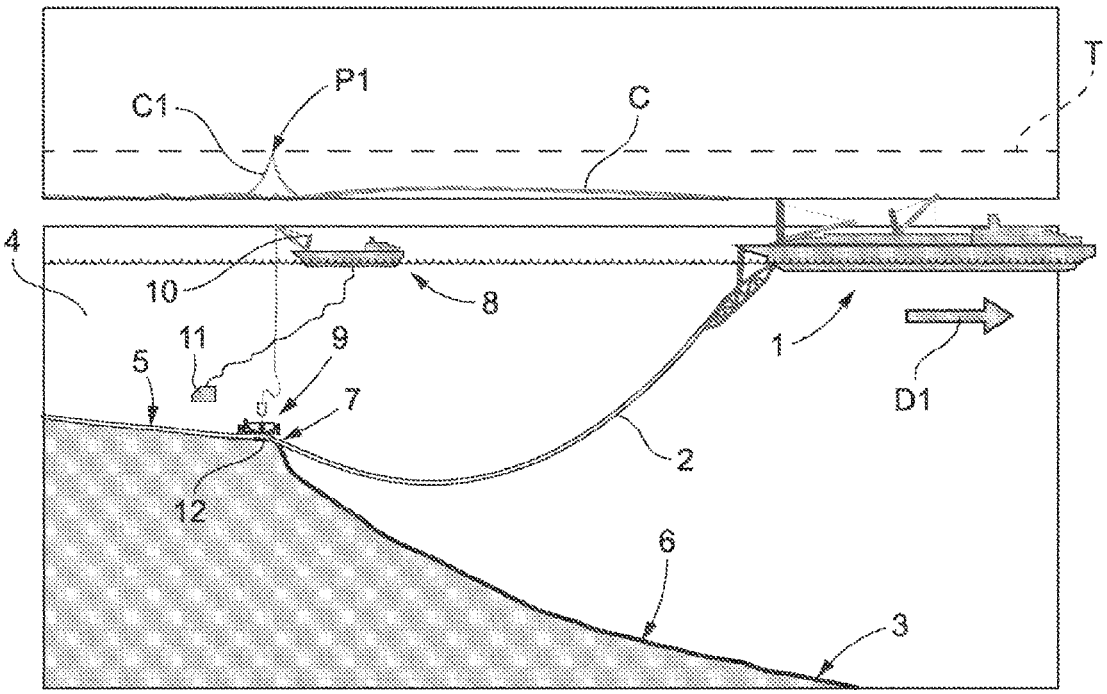
FIG. 6A
FIG. 6B

FIG. 7A
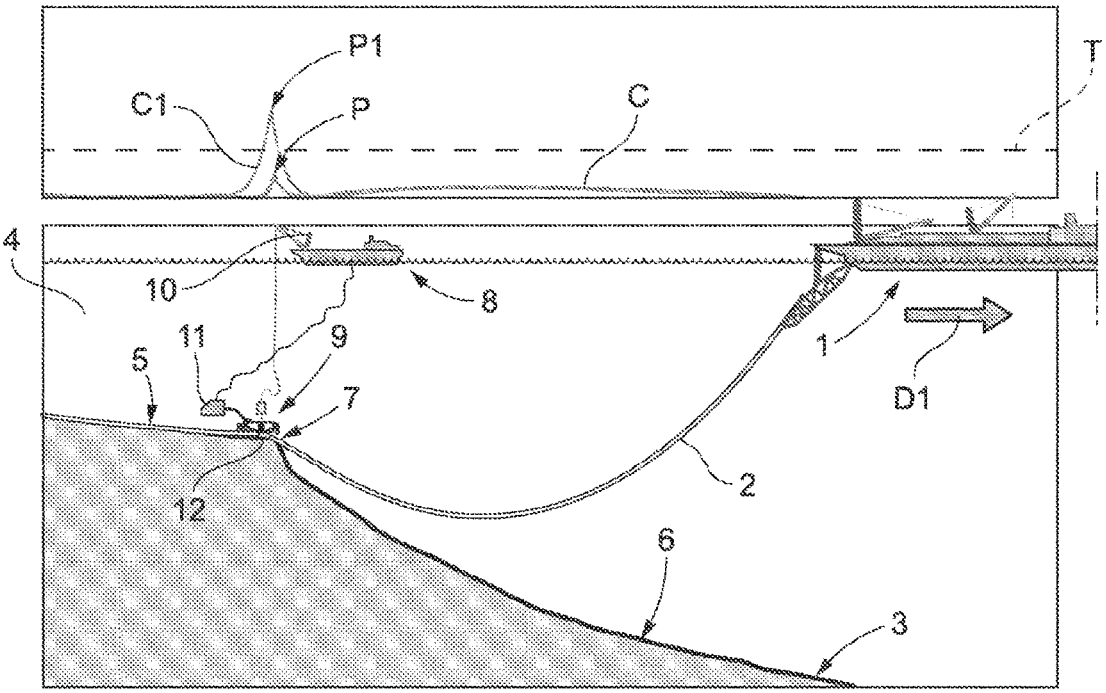
FIG. 7B
FIG. 8A
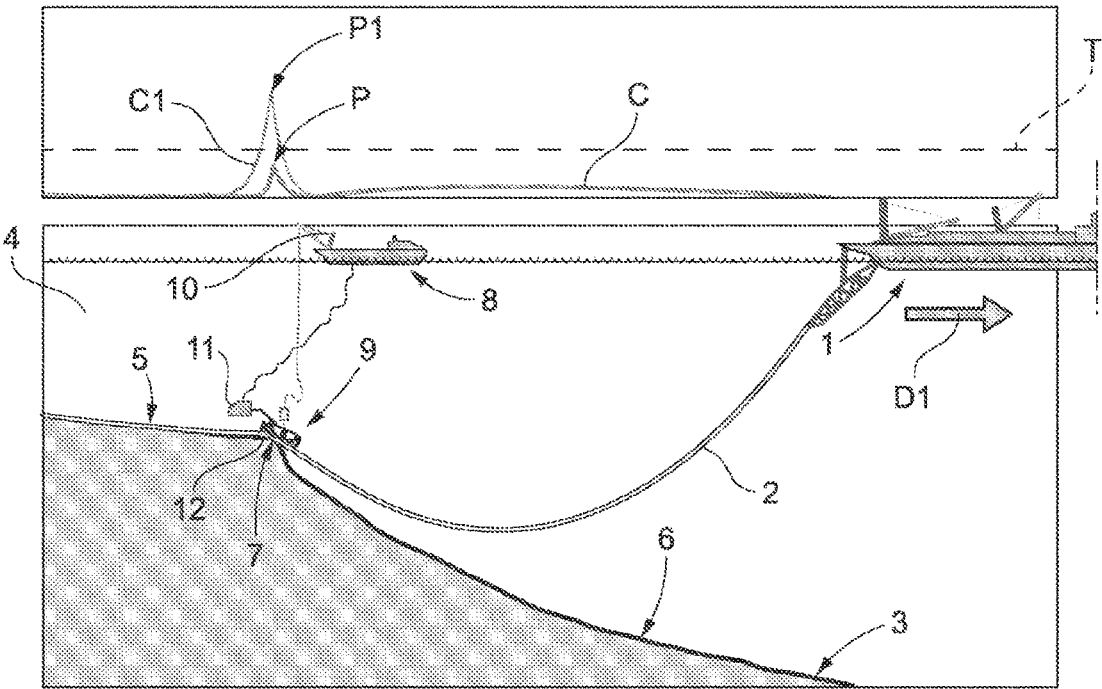
FIG. 8B

FIG. 9A
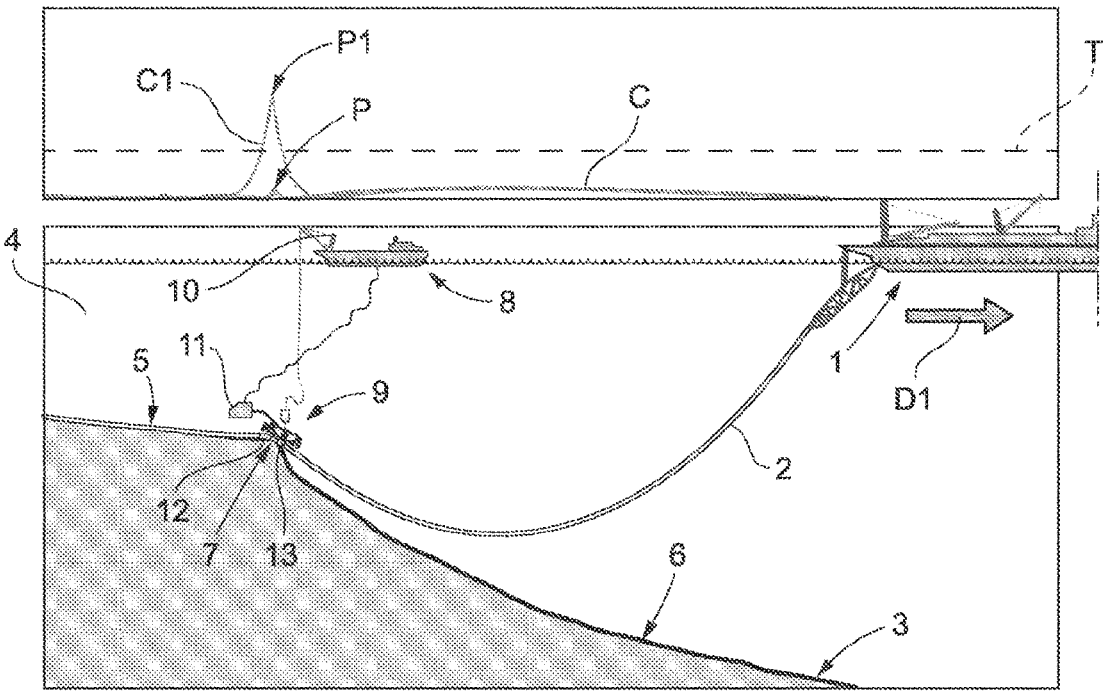
FIG. 9B
FIG. 10A
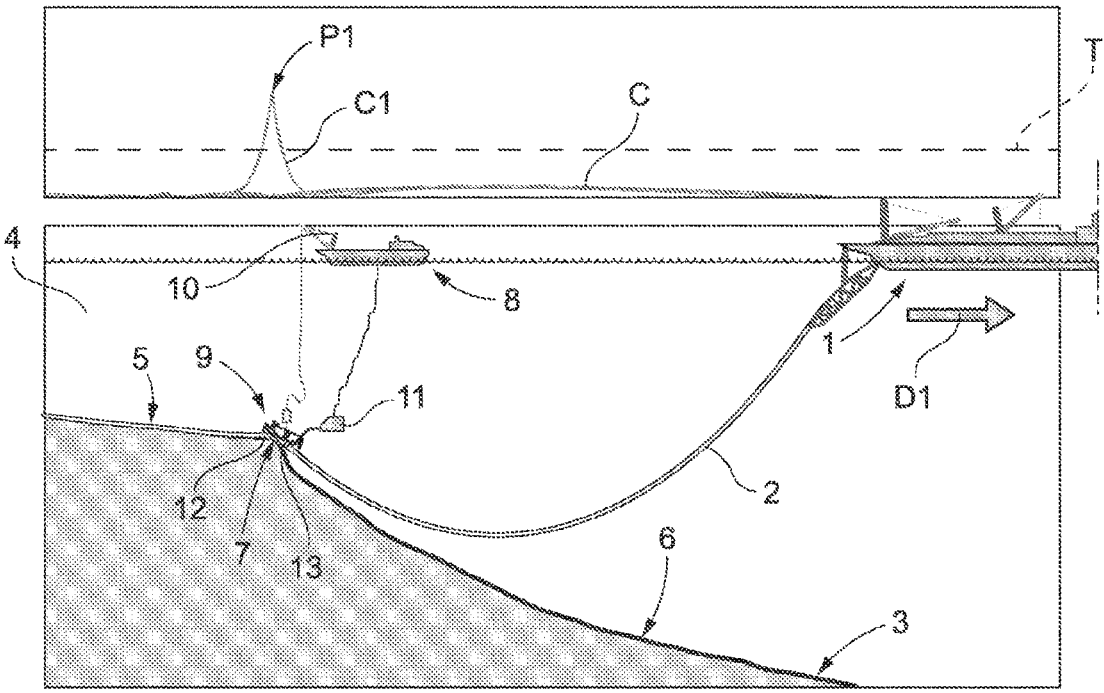
FIG. 10B

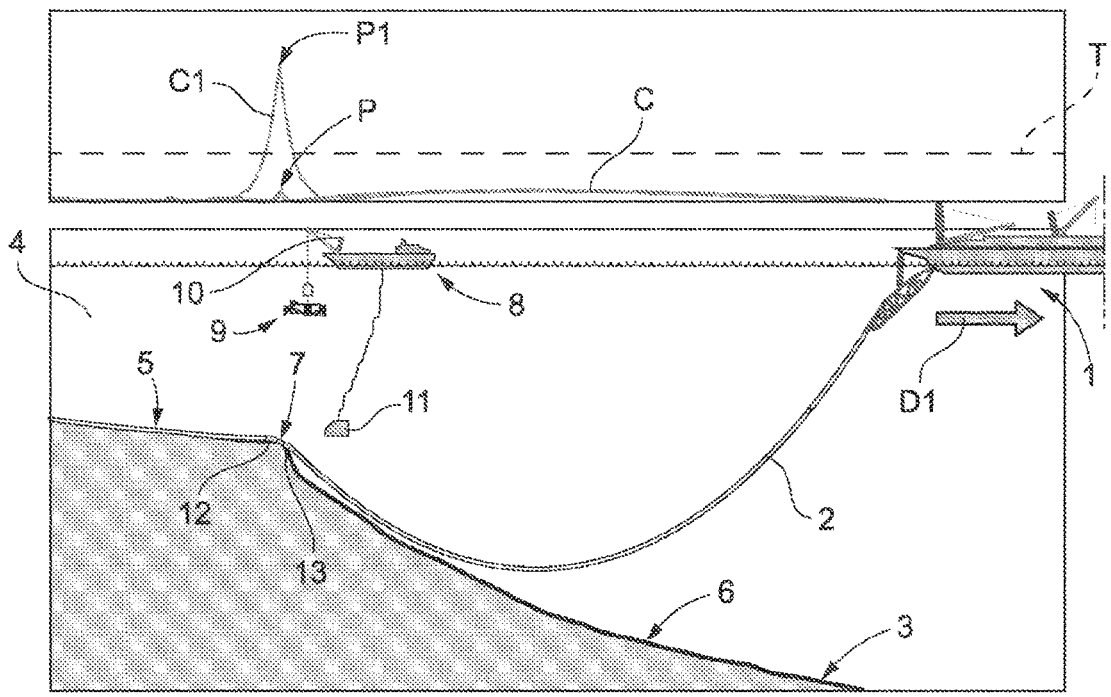
FIG. 11A
FIG. 11B
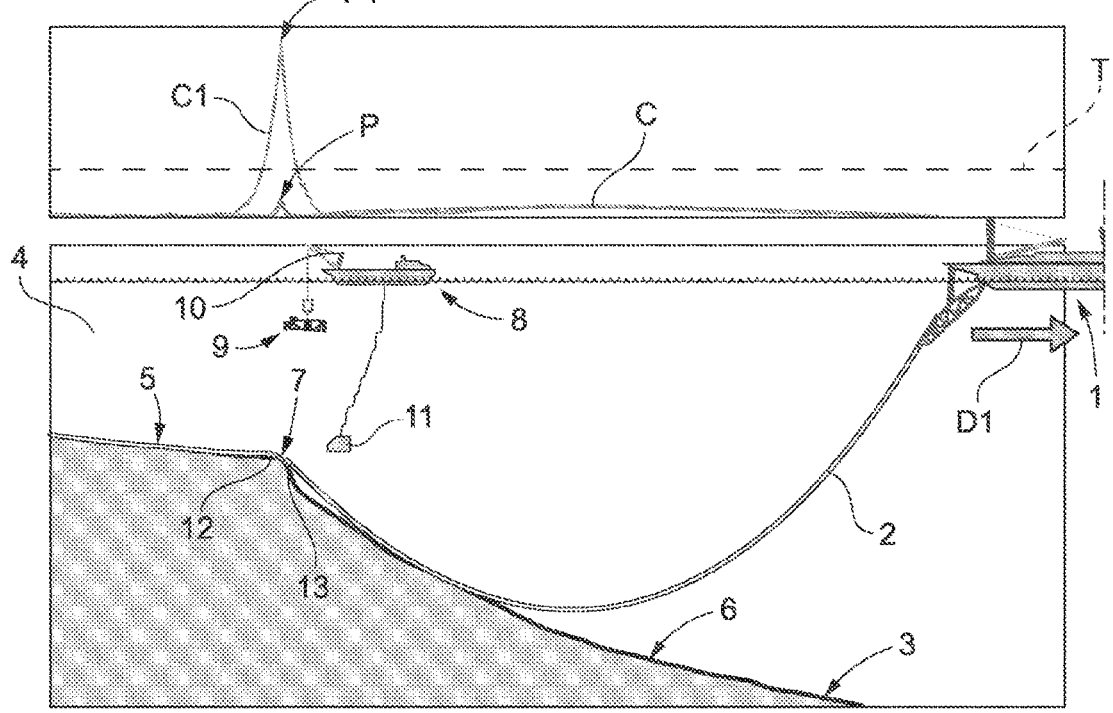
FIG. 12A
FIG. 12B

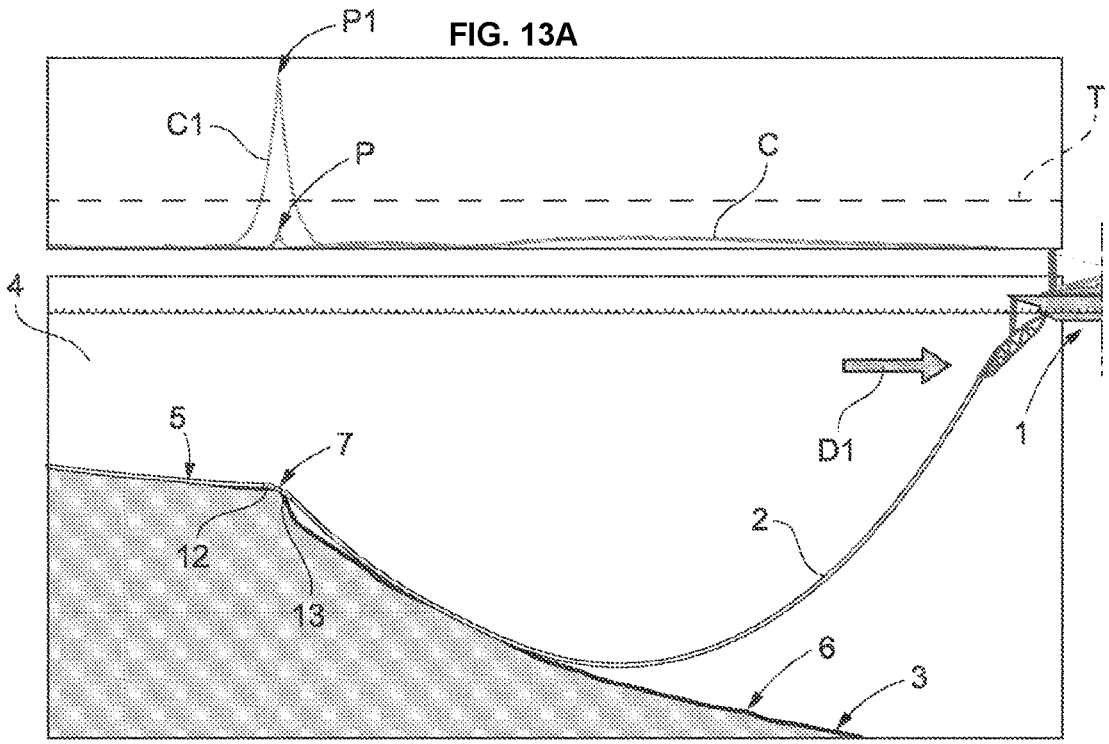
FIG. 13A
FIG. 13B
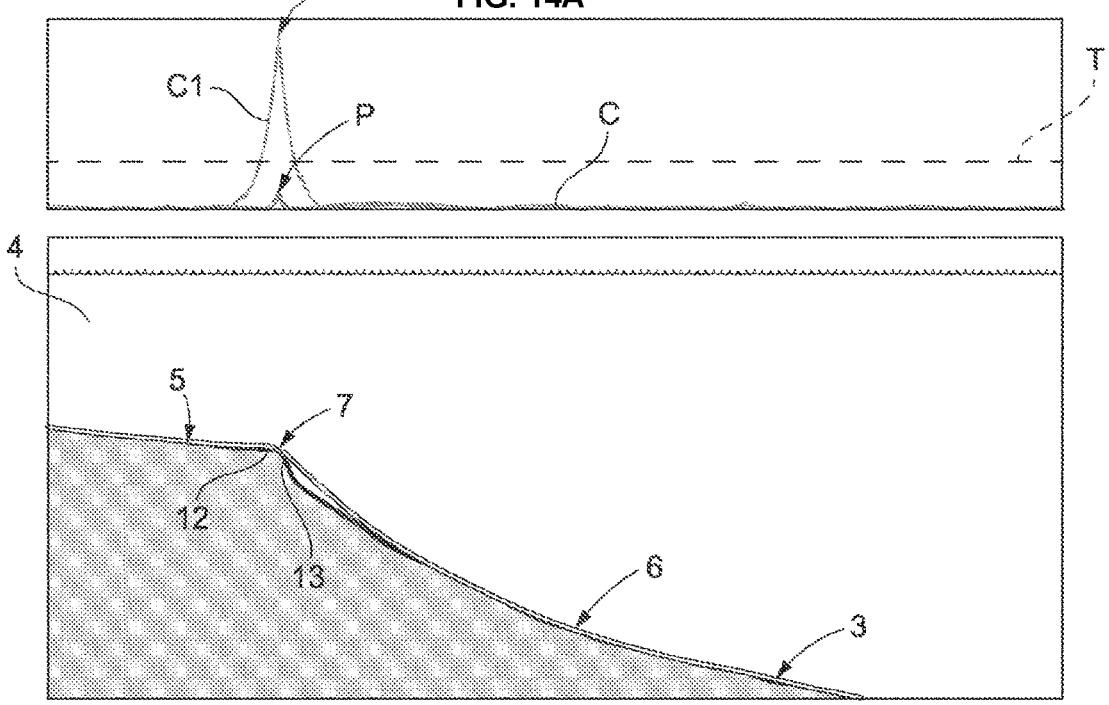
FIG. 14A
FIG. 14B

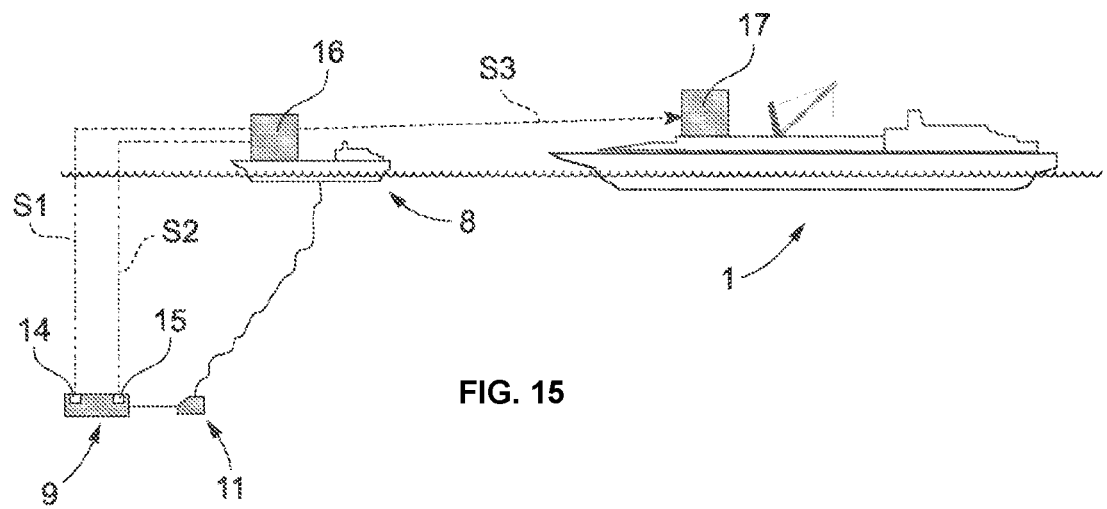
FIG. 15
FIG. 16A
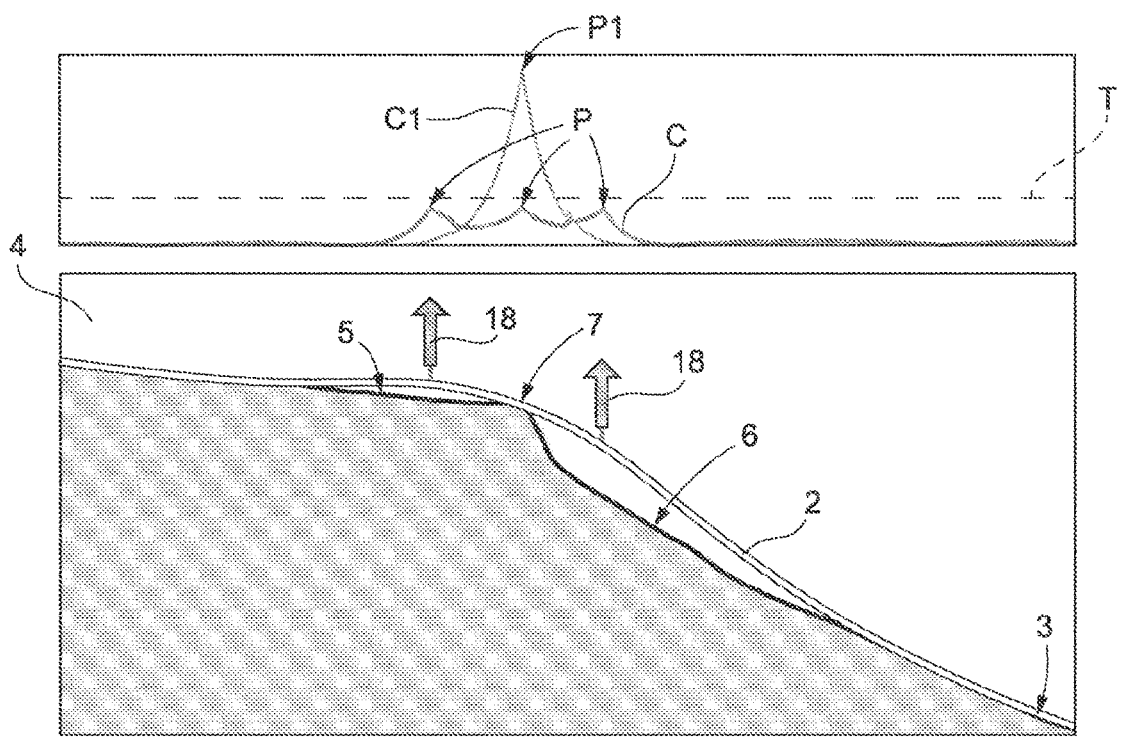
FIG. 16B

METHOD AND SYSTEM FOR LAYING A PIPELINE ON THE BED OF A BODY OF WATER

PRIORITY CLAIM

This application is a national stage application of PCT/IB2019/057822, filed on Sep. 17, 2019, which claims the benefit of and priority to Italian Patent Application No. 102018000008658, filed on Sep. 17, 2018, the entire contents of which are each incorporated by reference herein.

TECHNICAL FIELD

The present disclosure relates to a method and a system for laying a pipeline on the bed of a body of water.

BACKGROUND

Hydrocarbon transport pipelines are laid on the bed of a body of water by laying vessels, each of which is configured to assemble the pipeline on board the laying vessel and launch the pipeline as the pipeline is assembled. The laying vessel therefore includes assembly equipment and a launch ramp for the so-called S-laying, or a launch tower for the so-called J-laying. The letters "S" and "J" identify the type of laying in relation to the shape taken by the pipeline between the laying vessel and the bed of the body of water. The so-called S-laying is particularly suitable for laying pipelines with relatively high productivity in relatively medium shallow water, whereas the so-called J-laying is suitable for laying the pipeline in relatively deep water.

Generally, the pipeline is relatively flexible enough to adapt to the profile of the bed of the body of water. However, there are situations in which the profile of the bed of the body of water has abrupt changes in slope and the diameter of the pipeline is relatively large, resulting in a reduced flexibility of the pipeline. The combination of the above factors brings about configurations in which the pipeline is partly suspended with respect to the bed of the body of water and the bending moment stresses in the pipeline exceed threshold values, and for this reason can cause uncontrolled deformation of the pipeline.

Several solutions are known for mitigating the problem described above.

A first solution consists in modifying the profile of the bed of the body of water, before or after laying the pipeline, by earthmoving operations that are all the more relatively complex the greater the depth of the bed of the body of water.

A second solution involves the use of supports that modify the resting configuration of the pipeline on the seabed, or of components such as buoys and flexible joints which modify the configuration of the pipeline along the section exhibiting the change in slope (e.g., see PCT Patent Application Publication No. WO2011008704, and U.S. Pat. No. 7,963,721).

A third solution involves the use of articulated joints that can be inserted in the launching sequence (dummy pipelaying), hinged together and at the two ends of the pipeline. These ends are hydraulically closed with Y-shaped flanged branches which split the pipeline into two directions with structural and hydraulic continuity (e.g., see PCT Patent Application Publication No. WO2017013541 in the name of the applicant).

A fourth solution consists in a non-continuous launching method comprising the laying of prefabricated pipeline sections that reproduce the profile of the body of water. These pipeline sections are prefabricated, transported floating and sunk in a controlled manner as described in PCT Patent Application Publication No. WO 2016/046,805 in the name of the applicant.

A further solution consists in carrying out a controlled, permanent plastic deformation of the pipeline in situ. In the context of launching underwater pipelines, EP Patent No. 963,798 in the name of the applicant describes a machine which can be clamped to the pipeline and is movable along the pipeline. The machine comprises a U-shaped frame which can be selectively clamped to the pipeline at a desired position, wheels for positioning the machine precisely along the pipeline, and a central rotation fulcrum comprising two anvils hinged to the frame.

A still further solution consists in affixing a bending restrictor assembly to a pipeline and applying external forces the pipeline or to the bending restrictor assembly for bending the pipeline.

All the available solutions have advantages and disadvantages and the use of one solution in place of another depends on a plurality of conditions that can make one solution technically sound and cost-effective compared to the others.

Making a curved section in situ through controlled plastic deformation has considerable advantages in certain operating conditions, however, it has some limitations due to the possible occurrence of uncontrolled deformations, such as for example the breaking, collapse, or buckling, before making the curved section through the controlled plastic deformation of the pipeline.

SUMMARY

The object of the present disclosure is to provide a method which can mitigate certain of the drawbacks of certain of the prior art.

In accordance with the present disclosure, there is provided a method for laying a pipeline on the bed of a body of water, the method comprising the steps of:
- assembling a pipeline on a laying vessel;
- launching the pipeline from the laying vessel;
- identifying a zone of the bed of the body of water that causes stresses greater than a threshold value determined for the pipeline;
- progressively laying the pipeline on the bed of the body of water by advancing the laying vessel;
- making at least one curved section along the pipeline with a curvature concordant with the curvature assumed by the pipeline in proximity to said zone by a controlled plastic deformation, when the pipeline is at least partly laid on the bed of the body of water and partly suspended with respect to the bed of the body of water in proximity to said zone;
- acquiring signals correlated to the angle and length of the curved section while the curved section is under construction; and
- comparing the signals with reference parameters.

The present disclosure enables one or more curved sections to be made during the laying of the pipeline on the bed of the body of water or in a pause between the laying operations. It should be appreciated that the pipeline being subjected to a controlled plastic deformation when the pipeline is at least partly laid and partly suspended on the bed of the body of water and the curved section having a curvature concordant with the curvature assumed by the pipeline enables the curved section to be made in a stable equilibrium condition. Keeping the pipeline at least partly suspended prevents the stresses on the pipeline from exceeding relatively critical values. In this way, whether the curved section actually corresponds to the design parameters is monitored during the construction of the curved section.

In particular, the method comprises transmitting to the laying vessel a signal deriving from the comparison of the angle and length of the curved section with the reference parameters. The information in real time concerning the construction of the curved section makes it possible to evaluate how to proceed with the laying operations.

In particular, the method comprises calculating a further signal as a function of the said signals for correcting a graph correlated to the stresses generated in the pipeline; and showing the corrected graph on board the laying vessel. In this way, information concerning the stresses on the pipeline can be obtained in real time and the successive laying operations can be evaluated based on the curved section under construction.

In particular, the method comprises making a plurality of close step bends in said pipeline, said curved section comprising a succession of close bends. In this way, each bend is only a slight bend comprised in the range between 0° 30' and 1° 30'.

In accordance with a particular embodiment of the disclosure, the method comprises making at least a first curved section upstream of said zone with reference to the direction of laying of the pipeline and at least a second curved section downstream of said zone.

Generally, the pipeline is in contact with the relatively most critical zone, so that it is relatively easier to bend the pipeline upstream and downstream of the critical zone instead of bending the pipeline in the critical contact zone.

In particular, the method comprises making the first and the second curved section when the pipeline downstream of said critical zone is suspended between said critical zone and the laying vessel. In this way, the pipeline can be bent before the stresses on the pipeline exceed a designated threshold value.

In particular, the method comprises laying the pipeline upstream of said zone up to said zone; making the first curved section upstream of the zone; advancing the laying vessel for lowering the level of the pipeline downstream of said zone; making the second curved section downstream of said zone; and laying the pipeline downstream of said zone.

The described sequence enables the pipeline to be clamped with a bending machine.

In accordance with a second embodiment of the present disclosure, the method comprises laying the pipeline in said zone; keeping in suspension a section of the pipeline upstream of the said zone for reducing stresses on the pipeline by at least one support downstream of the said zone, and keeping in suspension the pipeline downstream of the said zone for reducing stresses on the pipeline by at least a second support. In this way, pipeline laying operations are not interrupted and the pipeline is curved after the laying thereof.

In particular, the method comprises making the first curved section upstream of the said zone and the second curved section downstream of the zone; and removing the first and the second support. In this way, the pipeline assumes its final configuration.

Another object of the present disclosure is to provide a system for laying a pipeline on the bed of a body of water, which is free from certain of the drawbacks of certain of the prior art.

In accordance with the present disclosure, there is provided a system for laying a pipeline on the bed of a body of water, the system comprising:
  a laying vessel configured for assembling a pipeline, launching the pipeline into the body of water, and progressively laying the pipeline on the bed of the body of water by advancing the laying vessel;
  a remotely operated vehicle ("ROV") configured to monitor the position of the pipeline on the bed of the body of water with respect to a zone of the bed that causes stresses higher than a threshold value determined for the pipeline; and
  a bending machine to be coupled to the pipeline for making, through controlled plastic deformation, at least one curved section along the pipeline which is concordant with the curvature assumed by the pipeline in proximity to said zone, when the pipeline is at least partly laid on the bed of the body of water and partly suspended with respect to the bed of the body of water in proximity to said zone, wherein the bending machine comprises an inclinometer and an odometer for acquiring respective signals correlated to the angle and length of the curved section while the curved section is under construction; and the system comprises a microprocessor configured to compare said signals with reference parameters.

It should be appreciated that by employing such a system it is possible to estimate the stresses on the pipeline according to the position of the pipeline on the bed of the body of water and intervene with the bending machine before the estimated stresses exceed a threshold value. In this way, it is possible to check whether the curved section corresponds to the design parameters even during construction.

In particular, the microprocessor is configured to calculate a further signal as a function of said signals and of the reference parameters and transmit the further signal to the laying vessel for correcting a graph correlated to the stresses generated in the pipeline; the laying vessel comprising a display to show the corrected graph on board the laying vessel.

The information provided on board the laying vessel makes it possible to decide how to manage the laying operations.

BRIEF DESCRIPTION OF THE FIGURES

Further features and advantages of the present disclosure will be apparent from the following description of non-limiting embodiments thereof, with reference to the figures of the accompanying drawings, wherein:

FIGS. 1A and 1B (collectively "FIG. 1"), 2A and 2B (collectively "FIG. 2"), 3A and 3B (collectively "FIG. 3"), 4A and 4B (collectively "FIG. 4"), 5A and 5B (collectively "FIG. 5"), 6A and 6B (collectively "FIG. 6"), 7A and 7B (collectively "FIG. 7"), 8A and 8B (collectively "FIG. 8"), 9A and 9B (collectively "FIG. 9"), 10A and 10B (collectively "FIG. 10"), 11A and 11B (collectively "FIG. 11"), 12A and 12B (collectively "FIG. 12"), 13A and 13B (collectively "FIG. 13"), and 14A and 14B (collectively "FIG. 14") are schematic side elevation views, with parts removed for clarity, of successive steps of laying a pipeline on the bed of a body of water in accordance with a first embodiment of the method object of the present disclosure; each of the schematic FIGS. 1 to 14 is associated with one or more graphs which show the stresses on the pipeline estimated as a function of the configuration and structure of the pipeline and of the configuration of the bed of the body of water;

FIG. 15 is a schematic view, with parts removed for clarity, of the system object of the present disclosure; and FIGS. 16A and 16B (collectively "FIG. 16"), 17A and 17B (collectively "FIG. 17") and 18A and 18B (collectively "FIG. 18") are schematic side elevation views, with parts removed for clarity, of successive steps of laying a pipeline on the bed of a body of water in accordance with a second embodiment of the method object of the present disclosure; each of the schematic FIGS. 16 to 18 is associated with one or more graphs which show the stresses on the pipeline estimated as a function of the configuration and structure of the pipeline and of the configuration of the bed of the body of water.

DETAILED DESCRIPTION

Figure 17A:
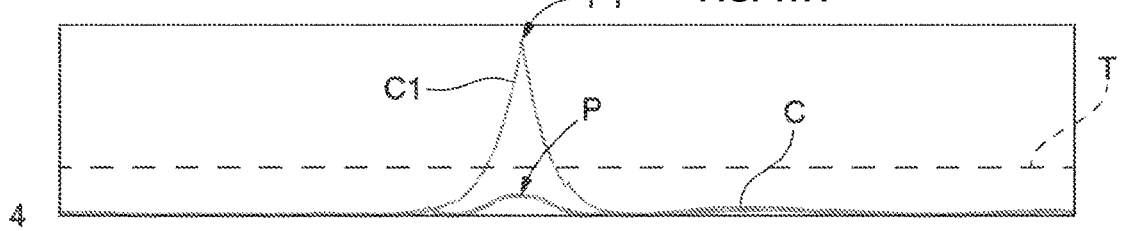

With reference to FIG. 1, a laying vessel 1 configured to lay a pipeline 2 on a bed 3 of a body of water 4 is depicted as a whole. The term "pipeline" refers to both a completed pipeline and a pipeline under construction.

The Figures show a laying vessel 1 for S-laying. It should be appreciated that the definition "laying vessel" refers to both a laying vessel for S-laying and a laying vessel for J-laying. The laying vessel 1 is equipped to assemble the pipeline 2, progressively launch the pipeline 2, and lay the pipeline 2 as the pipeline advances in the direction of travel D1.

Generally, the conformation of the bed 3 is relatively very variable depending on the geographical areas and often there are geological conformations that can induce critical stresses on the pipeline 2. The case illustrated in the Figures shows a bed 3 which comprises a zone 5 close to the shore defined by the so-called "continental shelf" and a zone 6 adjacent to the zone 5 and defined by the so-called "continental slope". The zone 5 and the zone 6 meet in a zone 7, which is characterized by a relatively strong change in slope and, in substance, is the tip of a protrusion of the bed 3 and represents a relatively high criticality for the pipeline 2 as it could cause uncontrolled bends in the pipeline 2.

In FIG. 1, the pipeline 2 is laid on the zone 5 (continental shelf) up to the zone 7 and is suspended in the body of water 4 between the zone 7 and the laying vessel 1 above the zone 6. The graph C associated with FIG. 1 shows the stress on the pipeline 2 according to a predefined scale. Exceeding a threshold value T represents a relative critical condition for the pipeline 2 which could cause uncontrolled bends in the pipeline 2. In the graph associated with FIG. 1, the graph C is below the threshold value T.

In FIG. 2, the laying vessel 1 has moved forward and launched a further portion of the pipeline 2 compared to FIG. 1. Since the portion of the pipeline 2 suspended between the zone 7 and the laying vessel 1 is larger than that of FIG. 1, the graph C correlated to the stress on the pipeline 2 in the zone 7 has a peak P, which corresponds to the zone 7 but is still below the threshold value T.

In FIG. 3, the laying vessel 1 has moved further forward and launched a new section of the pipeline 2 compared to FIG. 2. Consequently, the peak P in the zone 7 is very close to the threshold value T. The weight of the suspended section of the pipeline 2 also causes the lifting of a section of the pipeline 2 laid on the zone 5 in the proximity and upstream of the zone 7. In practice, the pipeline 2 is pivoting on the zone 7. Under these conditions, continuing with the laying of the pipeline 2 would cause stresses higher than the threshold value T, which could bring about an uncontrolled deformation of the pipeline 2 in proximity to the zone 7. The laying operations are therefore suspended.

The graph C is calculated, through certain algorithms, as a function of the characteristics of the bed 3, the geometrical and structural characteristics of the pipeline 2, and the configuration assumed by the pipeline 2.

To continue the laying operations without causing damage to the pipeline 2 it is necessary to intervene by bending the pipeline 2 in a controlled manner in the zone 7. For this purpose, a support vessel 8 transports a bending machine 9 to the zone 7, and by a crane 10 launches the bending machine 9 into the body of water 4 next to the pipeline 2 in proximity to the zone 7.

In FIG. 4, the bending machine 9 is clamped to the section of the pipeline 2 which is raised with respect to the zone 5 and in proximity to the zone 7. The launching and positioning operations of the bending machine 9 are assisted and controlled by a ROV 11 as shown in FIGS. 3 and 4.

With reference to FIGS. 5, 6, and 7, the bending machine 9 performs a series of relatively close bends so as to make a curved section 12 with a curvature concordant with the curvature assumed by the pipeline 2 in proximity to the zone 7 and, in this case, upstream of the zone 7.

The extent of each bend is comprised in the range between 0° 30' and 1° 30', and the step between two successive bends is comprised in the range of 5 cm to 15 cm. In practice, the bending machine 9 is advanced stepwise along the pipeline 2 until completion of the curved section 12. Each bend and the curved section 12 as a whole are cold and controlled plastic deformations.

During the construction of the curved section 12 the stresses on the pipeline 2 are progressively reduced and the laying operations can be resumed without generating stresses exceeding the threshold value T.

With reference to FIG. 8, the bending machine 9 is coupled to the section of the pipeline 2 suspended between the zone 7 and the laying vessel 1 and directly downstream of the zone 7. The operations of laying the pipeline 2 can again be interrupted if the stresses on the pipeline 2 are close to the threshold value T.

In FIGS. 9 and 10, a curved section 13 with a curvature concordant with the curvature assumed by the pipeline downstream of the zone 7 is made by a method similar to that described with reference to the curved section 12.

With reference to FIG. 11, once the curved section 13 has been made, the operations of laying the pipeline 2 are resumed while the bending machine 9 is recovered on board the support vessel 8.

The laying operations are subsequently completed by laying the pipeline 2 along the zone 6, as shown more clearly in FIGS. 12 to 14. Each of FIGS. 5 to 14 shows a comparison between the graph C1 correlated to the stresses on the pipeline 2 in the absence of the curved section 12 or of the curved sections 12 and 13, and the graph C correlated to the stresses on the pipeline 2 provided with the curved section 12 or with the curved sections 12 and 13. As a result of these comparisons, the graph C1 has a peak P1 well exceeding the threshold value T, whereas the graph C is entirely below the threshold value T.

The described method comprises making curved sections 12 and 13 with a curvature and a length such as to allow stresses on the pipeline 2 in accordance with the design parameters. For this purpose, the method comprises measuring the angle and the length of each of the curved sections 12 and 13 while they are under construction; and comparing the angle and length of the curved section with reference parameters.

With reference to FIG. 15, the bending machine 9 comprises an inclinometer 14 and an odometer 15 configured to acquire data from which to detect the angle and the length of the curved section and transmit respective signals S1 and S2 related to the angle and length of the curved section, respectively, to a microprocessor 16, which processes the data and emits a signal S3, which is used to refresh the graph C on a display 17 on board the laying vessel 1, so as to make it possible to evaluate when the operations of launching the pipeline 2 can be resumed without inducing relative excessive stress on the pipeline.

In certain embodiments, the transmission of the signals S1 and S2 between the bending machine 9 and the support vessel 8 is achieved by the ROV 11 and the transmission of the signal S3 between the support vessel 8 and the laying vessel 1 is achieved by telecommunication.

In accordance with an alternative embodiment of the present disclosure and with reference to FIG. 16, the pipeline 2 is laid both along the zone 5 and along the zone 6. In order to limit the stresses on the pipeline 2 and avoid damaging the pipeline 2 during the laying thereof, the pipeline 2 is locally supported upstream and downstream of the zone 7 by supports 18, in this case represented by buoys. The supports 18 are installed by ROVs (not shown) as the laying operations proceed and keep the stresses below the threshold value T and enable the pipeline 2 to form a relatively very large curved section around the zone 7, with portions of the pipeline 2 raised with respect to the bed 3 both upstream and downstream of position 7. As can be seen in FIG. 16, the graph C has three peaks P, which correspond to the zone 7 and the positions where the supports 18 are applied.

The bending machine 9 is coupled to the pipeline 2 upstream of the zone 7 to form the curved section 12 and downstream of the zone 7 to form the curved section 13 in accordance with the methods described with reference to the previous Figures. Both the curved sections 12 and 13 have a curvature concordant with the curvature assumed by the pipeline 2 in proximity to the zone 7 and are made by cold plastic deformation.

Figure 17B:
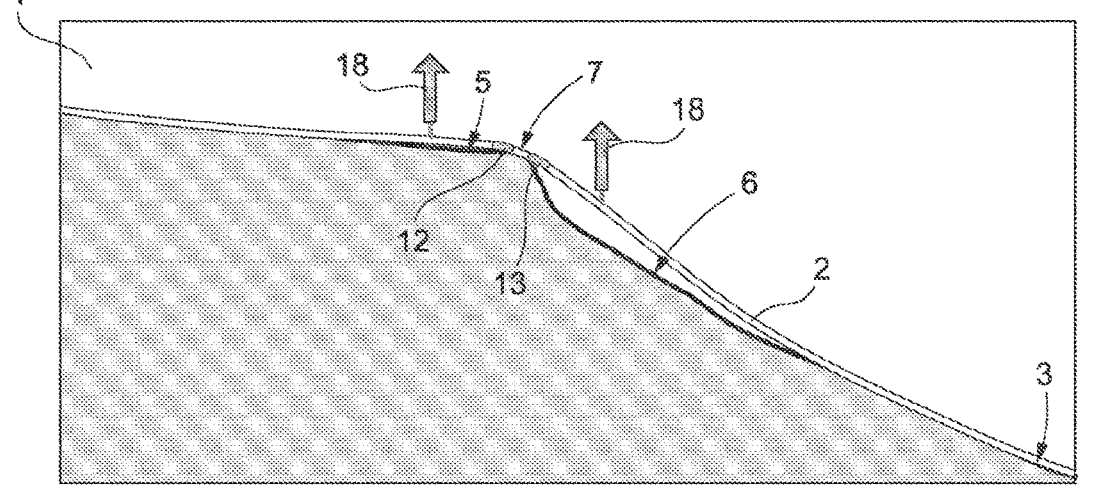

With reference to FIG. 17 and the associated graph C, once the curved sections 12 and 13 have been made, the peak P in the graph C is only found in the zone 7 and is below the threshold value T.

Figure 18A:
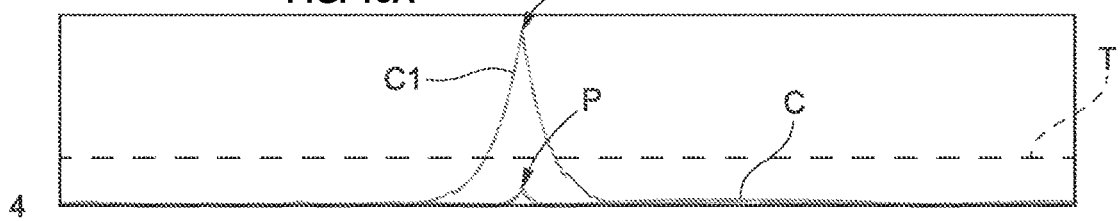
Figure 18B:
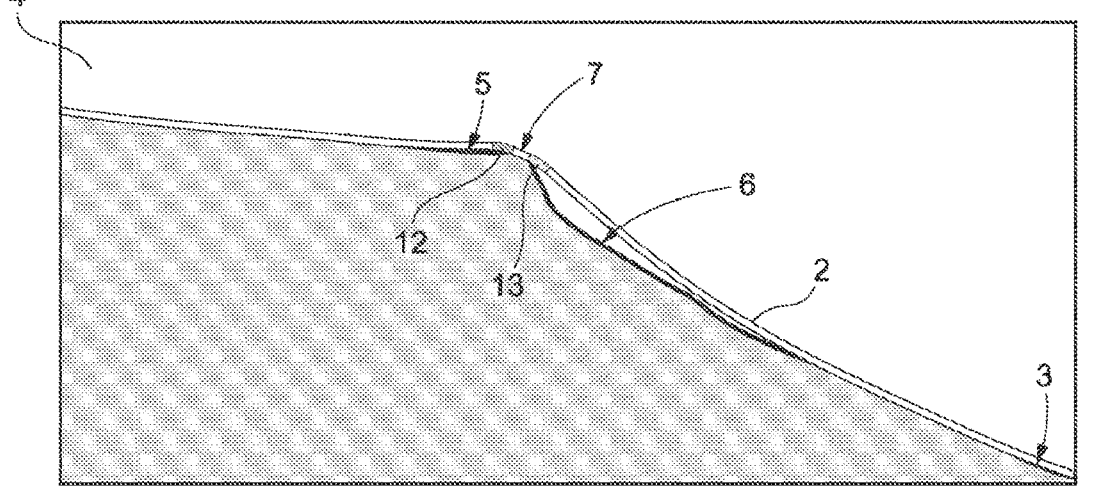

Subsequently, the supports 18 are removed by the ROVs (not shown) and the pipeline 2 is as shown in FIG. 18.

The present disclosure extends to further variants which are not explicitly described and which fall within the scope of protection of the claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A method of laying a pipeline on a bed of a body of water, the method comprising:
   assembling a pipeline on a laying vessel;
   launching the pipeline from the laying vessel;
   identifying a zone of the bed of the body of water that is estimated to cause stress on the pipeline greater than a threshold value determined for the pipeline, the estimated stress on the pipeline being based on a characteristic of the bed of the body of water, a geometrical characteristic of the pipeline, a structural characteristic of the pipeline, and a configuration assumed by the pipeline;
   progressively laying the pipeline on the bed of the body of water by advancing the laying vessel;
   forming, through the use of a bending machine, a curved section along the pipeline via a controlled plastic deformation, wherein the curved section is harmonious with a curvature assumed by the pipeline in association with the identified zone as a result of the pipeline being at least partly laid on the bed of the body of water and partly suspended with respect to the bed of the body of water;
   while the curved section is being formed, acquiring, through the use of the bending machine, a first signal correlated to an angle of the curved section and a second signal correlated to a length of the curved section; and
   comparing the first and second signals with reference parameters.

2. The method of claim 1, further comprising transmitting to the laying vessel a third signal based on the comparison of the first and second signals with the reference parameters.

3. The method of claim 2, further comprising:
   calculating the third signal to correct a graph correlated to the stress on the pipeline; and
   causing the corrected graph to be displayed on board the laying vessel.

4. The method of claim 1, further comprising forming, through the use of the bending machine, a plurality of bends in said pipeline, wherein the curved section comprises a succession of the bends.

5. The method of claim 4, wherein an extent of each bend is in a range between 0° 30' and 1° 30'.

6. The method of claim 1, wherein forming, through the use of the bending machine, the curved section comprises forming at least a first curved section upstream, relative to a direction of laying of the pipeline, of the zone and at least a second curved section downstream of the zone.

7. The method of claim 6, further comprising forming, through the use of the bending machine, the first curved section and the second curved section as a result of the pipeline downstream of the zone being suspended between the zone and the laying vessel.

8. The method of claim 7, further comprising, in succession:
   laying the pipeline upstream of the zone up to the zone;
   forming, through the use of the bending machine, the first curved section upstream of the zone;
   advancing the laying vessel to cause a lowering of the pipeline downstream of the zone;
   forming, through the use of the bending machine, the second curved section downstream of the zone; and
   laying the pipeline downstream of the zone.

9. The method of claim 1, further comprising:
   laying the pipeline in the zone;
   suspending a section of the pipeline upstream, relative to a direction of laying of the pipeline, of the zone to reduce the stress on the pipeline via at least a first support; and
   suspending a section of the pipeline downstream of the zone to reduce the stress on the pipeline via at least a second support.

10. The method of claim 9, further comprising removing the first support and the second support.

11. A system comprising:
a laying vessel configured to:
  assemble a pipeline,
  launch the pipeline into a body of water, and
  advance in a first direction to progressively lay the pipeline on a bed of the body of water;
a remotely operated vehicle configured to monitor a position of the pipeline on the bed of the body of water;
a bending machine coupleable to the pipeline and configured to form a curved section along the pipeline via a controlled plastic deformation, wherein:
  the bending machine comprises an inclinometer and an odometer configured to acquire, while the curved section is being formed, a first signal correlated to an angle of the curved section and a second signal correlated to a length of the curved section, and
  when the pipeline is at least partly laid on the bed of the body of water and partly suspended with respect to the bed of the body of water, the curved section is harmonious with a curvature assumed by the pipeline in association with a zone of the bed of the body of water that will cause stress on the pipeline higher than a threshold value determined for the pipeline; and
a microprocessor configured to:
  estimate stress on the pipeline based on a characteristic of the bed of the body of water, a geometrical characteristic of the pipeline, a structural characteristic of the pipeline, and a configuration assumed by the pipeline, and
  compare the first and second signals with reference parameters.

12. The system of claim 11, wherein:
the microprocessor is configured to:
  calculate a third signal based on the comparison of the first and second signals with the reference parameters, and
  transmit the third signal to the laying vessel to correct a graph correlated to the stress on the pipeline; and
the laying vessel comprises a display device to display the corrected graph on board the laying vessel.

13. The system of claim 11, wherein the bending machine is configured to advance along the pipeline and form a plurality of bends in the pipeline such that the curved section comprises a succession of bends.

14. The system of claim 13, wherein an extent of each bend is in a range between 0° 30' and 1° 30'.

15. The system of claim 11, further comprising a support vessel configured to launch the bending machine into the body of water and position the bending machine at a designated point along the pipeline in the body of water.

16. The system of claim 11, further comprising at least one support configured to be coupled to the pipeline to temporarily support the pipeline within a designated distance of the zone to reduce the stress on the pipeline before the forming of the curved section.

* * * * *